United States Patent
Yugami et al.

(10) Patent No.: US 6,927,801 B2
(45) Date of Patent: Aug. 9, 2005

(54) VIDEO SIGNAL PROCESSING APPARATUS AND VIDEO DISPLAYING APPARATUS

(75) Inventors: Masafumi Yugami, Kasukabe (JP); Makiko Suzuki, Tokyo (JP)

(73) Assignee: Victor Company of Japan, Ltd., Kanagawa-Ken (JP)

(*) Notice: Subject to any disclaimer, the term of this patent is extended or adjusted under 35 U.S.C. 154(b) by 526 days.

(21) Appl. No.: 09/988,194

(22) Filed: Nov. 19, 2001

(65) Prior Publication Data

US 2002/0060746 A1 May 23, 2002

(30) Foreign Application Priority Data

| Nov. 20, 2000 | (JP) | ................................... 2000-352360 |
| Oct. 11, 2001 | (JP) | ................................... 2001-313624 |
| Oct. 18, 2001 | (JP) | ................................... 2001-320332 |
| Oct. 18, 2001 | (JP) | ................................... 2001-320333 |

(51) Int. Cl.[7] .................. H04N 5/44; H04N 5/46; H04N 7/01; H04N 11/20
(52) U.S. Cl. .................. 348/458; 348/441; 348/445; 348/448; 348/555; 348/556; 348/564; 348/565; 348/705
(58) Field of Search ............................. 348/458, 441, 348/443, 445–448, 459, 554–5, 563–566, 588, 705, 711, 555, 556; H04N 5/44, 5/46, 7/01, 11/20

(56) References Cited

U.S. PATENT DOCUMENTS

| 5,187,575 | A | * | 2/1993 | Lim ............................ 348/558 |
| 5,325,131 | A | * | 6/1994 | Penney ........................ 348/706 |
| 5,444,491 | A | * | 8/1995 | Lim ............................ 348/441 |
| 5,508,746 | A | * | 4/1996 | Lim ........................ 375/240.25 |
| 5,530,484 | A | * | 6/1996 | Bhatt et al. .................. 348/556 |
| 5,576,769 | A | * | 11/1996 | Lendaro ...................... 348/511 |
| 5,963,261 | A | * | 10/1999 | Dean .......................... 348/446 |
| 6,275,267 | B1 | * | 8/2001 | Kobayashi ................... 348/555 |
| 6,327,000 | B1 | * | 12/2001 | Auld et al. .................. 348/441 |
| 6,437,787 | B1 | * | 8/2002 | Wu ............................ 345/519 |

* cited by examiner

*Primary Examiner*—Brian P. Yenke
(74) *Attorney, Agent, or Firm*—Jacobson Holman PLLC

(57) ABSTRACT

A video signal processing apparatus processes input video signals. A video signal source supplies the input video signals carrying at least a first video signal that is an interlaced signal having 480 effective scanning lines and a second video signal that is an interlaced signal having 1080 effective scanning lines. A video signal processor converts at least the first and the second video signals into a third video signal that is a progressive signal having 1440 effective scanning lines, thus outputting the third video signal. The output third video signal may be converted into a fourth video signal that is an interlaced signal by a progressive-to-interlace converter, thus outputting the fourth video signal.

1 Claim, 9 Drawing Sheets

VIDEO SIGNAL PROCESSING APPARATUS AND VIDEO DISPLAYING APPARATUS

BACKGROUND OF THE INVENTION

The present invention relates to a video signal processing apparatus and a video displaying apparatus suitable for processing and displaying video signals of several format types.

Video displaying apparatus such as TV sets have given a demand for displaying video signals of several format types with the start of digital TV broadcasting.

Format types for video signals are interlaced video (480i) of 525 total scanning lines and 480 effective scanning lines, interlaced video (1080i) of 1125 total scanning lines and 1080 effective scanning lines, progressive video (480p) of 525 total scanning lines and 480 effective scanning lines, and progressive video (720p) of 750 total scanning lines and 720 effective scanning lines.

These format types have the same vertical frequency. The number of effective scanning lines per field is however different, i.e., 480/2 lines for 480i, 1080/2 lines for 1080i, 480 lines for 480p, and 720 lines for 720p. The horizontal frequency is also different, i.e., 15.75 KHz for 480i, 33.75 KHz for 1080i, 31.5 KHz for 480p, and 45 KHz for 720p.

It has been studied to switch the horizontal frequency over 15.75 KHz, 33.75 KHz, 31.5 KHz and 45 KHz for video displaying apparatus in displaying video signals of all of these format types. Video displaying apparatus have to be compatible with these four different horizontal frequencies.

Interlace-to-progressive (I-P) conversion of 480i-video signals to 480p-video signals results in three different horizontal frequencies. Video displaying apparatus still have to be compatible with these three different horizontal frequencies.

To lighten a burden for video displaying apparatus, it has been studied to standardize several video formats into 1080i only.

For example, video displaying apparatus equipped with a cathode ray tube (CRT) require CRT-synchronization adjustments per format for displaying video signals of different formats, which causes large change in deflector voltage, thus a heavy burden for deflectors. Other types of video displaying apparatus also have to bear a heavy burden for displaying video signals of different formats.

CRT-synchronization adjustments per format requires temporal video-masking (blanking) on screen for picture quality. This results in complex control operation to video displaying apparatus and also no videos on screen temporarily. Accordingly, displaying video signals of different formats causes several problems.

For solving such problems, several video formats may be standardized into 1080i only as mentioned above. However, this also causes a problem. In detail, conversion of 480i into 1080i will produce scanning lines 9/4 times the number of original scanning lines. Moreover, conversion of 720p into 1080i will produce scanning lines 3/4 times the number of original scanning lines.

Standardization of video formats into 1080i thus results in the number of scanning lines made larger and also smaller through format conversion. This requires large hardware for interpolation filters used for format converting circuitry.

SUMMARY OF THE INVENTION

A purpose of the present invention is to provide a video signal processing apparatus and a video displaying apparatus capable of conversion of video signals of different format types into practically one and best format.

Another purpose of the present invention is to provide a video signal processing apparatus and a video displaying apparatus for displaying pictures at extremely high quality with the least increase in hardware and complexity in signal processing.

The present invention provides a video signal processing apparatus for processing input video signals including: a video signal source for supplying the input video signals carrying at least a first video signal that is an interlaced signal having 480 effective scanning lines and a second video signal that is an interlaced signal having 1080 effective scanning lines; and a video signal processor for converting at least the first and the second video signals into a third video signal that is a progressive signal having 1440 effective scanning lines, thus outputting the third video signal.

Moreover, the present invention provides a video displaying apparatus for displaying pictures based on input video signals carrying at least a first video signal that is an interlaced signal having 480 effective scanning lines and a second video signal that is an interlaced signal having 1080 effective scanning lines, the apparatus including: a video signal processor for converting at least the first and the second video signals into a third video signal that is a progressive signal having 1440 effective scanning lines, thus outputting the third video signal; and a displaying section for displaying pictures of the third video signal.

Furthermore, the video displaying apparatus for displaying pictures based on input video signals carrying at least a first video signal that is an interlaced signal having 480 effective scanning lines and a second video signal that is an interlaced signal having 1080 effective scanning lines, the apparatus including: a video signal processor for converting at least the first and the second video signals into a third video signal that is an interlaced signal having 1440 effective scanning lines, thus outputting the third video signal; and a displaying section for displaying pictures of the third video signal.

Moreover, the present invention provides a video displaying apparatus that receives input video signals carrying at least a first video signal that is an interlaced signal at a horizontal frequency of 15.75 KHz and a second video signal that is an interlaced signal at a horizontal frequency of 33.75 KHz, the apparatus including: a video signal processor for converting at least the first and the second video signals into a third video signal that is an interlaced signal; a cathode-ray-tube (CRT) displaying section for displaying pictures of the third video signal; a deflector for deflecting electron beams in the CRT displaying section in a horizontal direction and a vertical direction so that the CRT displaying section displays the pictures of the third video signal; and a phase-lock-loop circuitry, having a predetermined locking range including a frequency of 45 KHz, for supplying a single horizontal synchronizing signal at a frequency included in the locking range.

Furthermore, the present invention provides a video signal processing apparatus for processing input signals carrying at least a first video signal that is an interlaced signal having 480 effective scanning lines and a second video signal that is an interlaced signal having 1080 effective scanning lines, the apparatus including: a first converter for converting the number of the effective scanning lines of the first video signal into 1440, thus outputting the first video signal that is an interlaced signal having 1440 effective scanning lines; and a second converter for adding a non-video signal to the second video signal with no conversion of the number of the effective scanning lines of the second video signal, thus outputting the second video signal that is an interlaced signal having 1440 effective scanning lines.

Moreover, the present invention provides a video displaying apparatus for displaying pictures of input signals on displaying section at an aspect ratio of 4:3, the input signals carrying at least a first video signal that is an interlaced signal having 480 effective scanning lines and a second video signal that is an interlaced signal having 1080 effective scanning lines, the apparatus including: a first converter for converting the number of the effective scanning lines of the first video signal into 1440, thus outputting the first video signal that is an interlaced signal having 1440 effective scanning lines; a second converter for adding a non-video signal to the second video signal with no conversion of the number of the effective scanning lines of the second video signal, thus outputting the second video signal that is an interlaced signal having 1440 effective scanning lines, wherein a picture of the output second video signal is displayed on the displaying section almost on a middle zone in a vertical direction of the displaying section and non-picture portions corresponding to the non-video signal are arranged on upper and lower zones in the vertical direction of the displaying section.

Furthermore, the present invention provides a video displaying apparatus including a first video signal source for outputting a first video signal that is either of an interlaced signal having 480 effective scanning lines, another interlaced signal having 1080 effective scanning lines, a progressive signal having 480 effective scanning lines and another progressive signal having 720 effective scanning lines, a second video signal source for outputting a second video signal that is an interlaced signal having 480 effective scanning lines at an aspect ratio of 4:3, and a displaying section having an aspect ratio of 16:9, the apparatus including: a converter for converting the first video signal into a third video signal that is an interlaced signal having 1440 effective scanning lines; a scale-down section for scaling down the second video signal in a horizontal direction of the displaying section by cyclically decimating pixels of the second video signal in the horizontal direction with no decimation of the scanning lines of the second video signal; and a synthesizer for synthesizing the third video signal and the scaled-down second video signal so that a picture of the third video signal is displayed on a zone in the horizontal direction of the displaying section and another picture of the scaled-down second video signal is displayed on a remaining zone of the displaying section.

Furthermore, the present invention provides a video displaying apparatus including a first video signal source for outputting a first video signal that is either of an interlaced signal having 480 effective scanning lines, another interlaced signal having 1080 effective scanning lines, a progressive signal having 480 effective scanning lines and another progressive signal having 720 effective scanning lines, a second video signal source, a third video signal source and a fourth video signal source for outputting a second video signal, a third video signal and a fourth video signal, respectively, each of the second, the third and the fourth video signals being an interlaced signal having 480 effective scanning lines at an aspect ratio of 4:3, and a displaying section having an aspect ratio of 16:9, the apparatus including: a converter for converting the first video signal into a fifth video signal that is an interlaced signal having 1440 effective scanning lines; a scale-down section for scaling down the second, the third and the fourth video signals in a horizontal direction of the displaying section by cyclically decimating pixels of the second, the third and the fourth video signals in the horizontal direction with no decimation of the scanning lines of the second, the third and the fourth video signal; and a synthesizer for synthesizing the fifth first video signal and the scaled-down second, third and fourth video signals so that a picture of the fifth video signal is displayed on a zone in the horizontal direction of the displaying section and other pictures of the scaled-down second, third and fourth video signals are displayed on remaining zones of the displaying section as aligned in a vertical direction of the displaying section.

Furthermore, the present invention provides a video displaying apparatus including at least one video signal source for outputting a first video signal that is an interlaced signal having 480 effective scanning lines, the apparatus including: a displaying section capable of displaying pictures of a second video signal that is an interlaced signal having 1440 effective scanning lines; a picture processor for processing the first and the second video signals by allocating substantially all of scanning lines of the first video signal to a part of the second video signal with no cyclic decimation of and no increase in the scanning lines of the first video signal; and a driver for driving the displaying section to display pictures of the processed first and second video signals.

Moreover the present invention provides a video displaying apparatus including a video signal source for outputting a first video signal, a second video signal and a third video signal, each being an interlaced signal having 480 effective scanning lines and carrying moving pictures or still pictures, the apparatus including: a displaying section capable of displaying pictures of a fourth video signal that is an interlaced signal having 1440 effective scanning lines; a picture processor for processing the first, the second and the third video signals by allocating substantially all of scanning lines of the first, the second and the third video signals to the fourth video signal with no cyclic decimation of and no increase in the scanning lines of the first, the second and the third video signals; and a driver for driving the displaying section to display the processed first, second and third video signals as aligned in a vertical direction of the displaying section.

Still furthermore, the present invention provides a video signal processing method of processing input video signals carrying at least a first video signal that is an interlaced signal having 480 effective scanning lines and a second video signal that is an interlaced signal having 1080 effective scanning lines, the method including the step of converting at least the first and the second video signals into a third video signal that is a progressive signal having 1440 effective scanning lines, thus outputting the third video signal.

DETAILED DESCRIPTION OF PREFERRED EMBODIMENTS

Preferred embodiments according to the present invention will be disclosed with reference to the attached drawings.

A feature of a video signal processing apparatus and a video displaying apparatus is format conversion into interlaced video (1440i) of 1440 effective scanning lines or progressive video (1440p) of 1440 effective scanning lines from any of 480i-, 1080i-, 480p- and 720p-input video signals.

Figure 1:
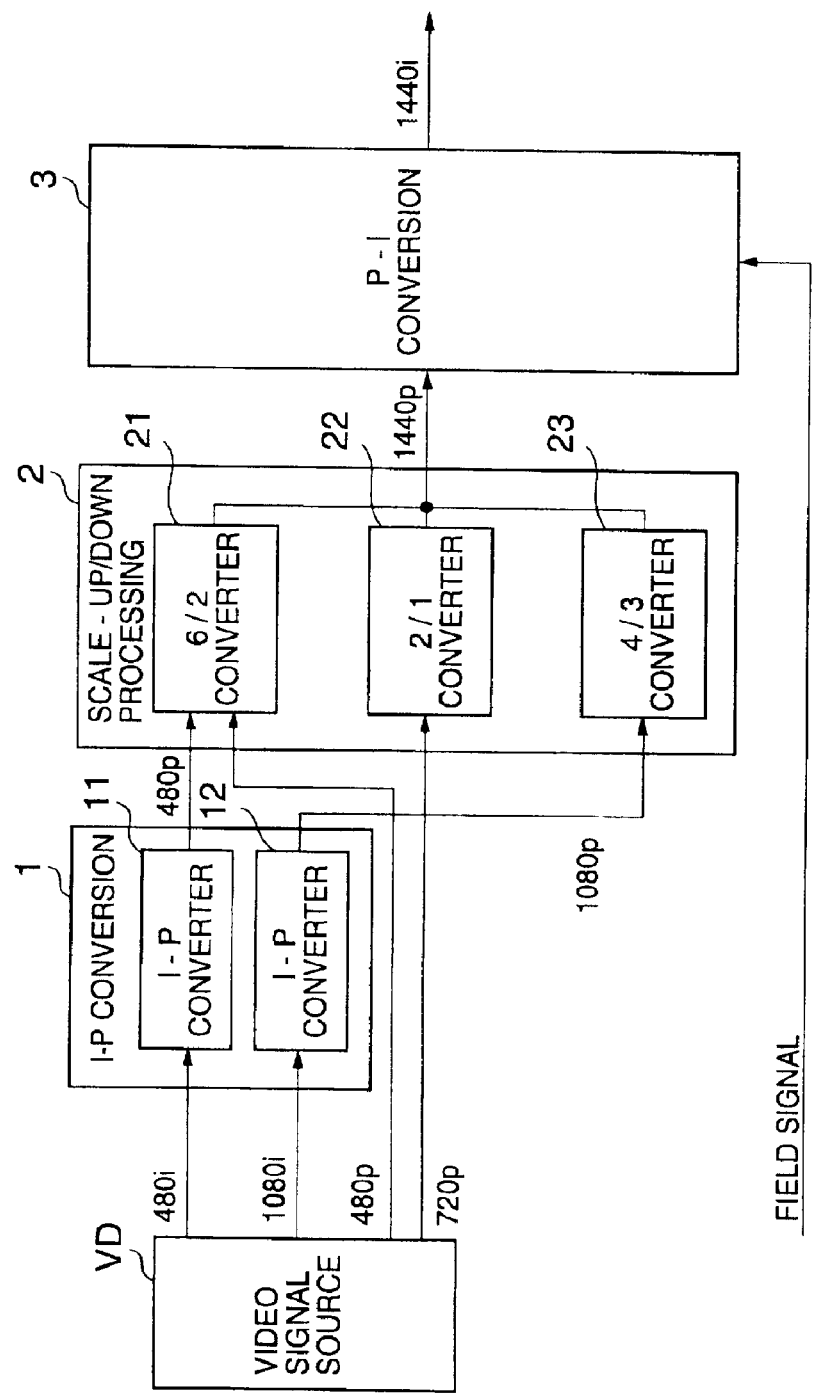
FIG. 1 shows a block diagram of a first embodiment according to the present invention.

FIG. 1 shows a specific configuration for format conversion into 1440i or 1440p format.

Formats of input video signals in this preferred embodiment are four types, i.e., 480i, 1080i, 480p and 720p. However, a video displaying apparatus according to the present invention does not always need all of these four types. The present invention can be applied to combination of input signals of at least any of two among the four types.

In FIG. 1, a 480i (interlaced)-input video signal supplied from a video signal source VD is fed to an I-P converter 11 of an I-P conversion section 1 and converted into a 480p (progressive)-video signal. A 1080i-input video signal supplied from the video signal source VD is fed to another I-P converter 12 of the I-P conversion section 1 and converted into a 1080p-video signal. Conversion of interlaced signals into progressive signals increases the amount of data per field and enhances high-picture quality processing at a scale-up/down processing section 2.

The I-P converters 11 and 12 produce progressive signals of 480p and 1080p, respectively, which may be performed by doubling the scanning line density of the input signal or using progressive signal-interpolation data stored in buffer, etc.

The 480p-video signal output by the I-P converter 11 is supplied to a 6/2 converter 21 of the scale-up/down processing section 2. The 1080p-video signal output by the I-P converter 12 is supplied to a 4/3 converter 23 of the scale-up/down processing section 2.

A 480p-input video signal supplied from the video signal source VD is supplied to the 6/2 converter 21. A 720p-input video signal supplied from the video signal source VD is supplied to a 2/1 converter 22.

Only one video signal source VD is shown in FIG. 1, however, which may be separated into several sources for supplying 480i-, 1080i-, 480p- and 720p-video signals, respectively. Moreover, the video signal source VD may be a receiver for digital TV broadcasting, a video tape recorder or a video disc player. The video signal source VD detects the format of an input signal and supplies it via switch to the I-P converter 11 if it is a 480i signal, the I-P converter 12 if a 1080i signal, the 6/2 converter 21 if a 480p signal, and the 2/1 converter 22 if a 720p signal.

The 6/2 converter 21, 2/1 converter 22 and 4/3 converter 23 convert the input 480p-, 720p- and 1080p-signals into a 1440p signal, respectively, by multiplying the number of scanning lines of the input signals by 6/2, 2/1 and 4/3, respectively.

All the processing to the 480p-, 720p- and 1080p-input signals is a scale-up processing for displaying scaled-up pictures in this embodiment, however, the section 2 is called a scale-up/down processing section that can also perform a scale-down processing for displaying scaled-down pictures, etc.

Figure 2:
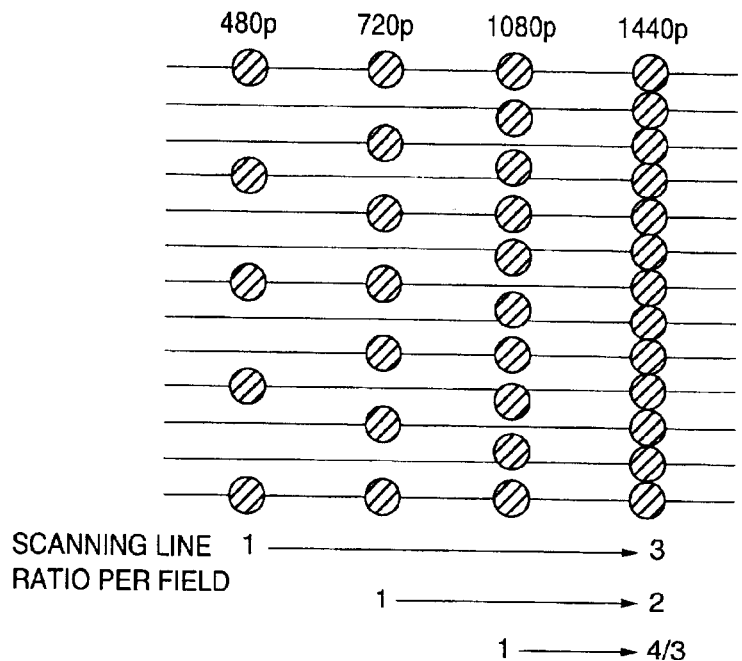
FIG. 2 illustrates conversion of 480p, 720p and 1080p formats into 1440p format.

FIG. 2 illustrates scanning line conversion from 480p, 720p and 1080p signals to a 1440p signal. The number of scanning lines of the 1440p signal is 3 times, 2 times and 4/3 times that of the 480p, 720p and 1080p signals, respectively, in this scanning line conversion.

Accordingly, all the scanning line conversion processing for format conversion in the scale-up/down processing section 2 is the scale-up processing in this embodiment. This processing achieves data completeness against the scale-down processing for standardization to 1080i format discussed already, which causes data missing.

Interpolation ratios for interpolation filters of the 6/2 converter 21, 2/1 converter 22 and 4/3 converter 23 are mere integer ratios for simple provision of filter coefficients, which thus require relatively small hardware for the converters 21, 22 and 23 in FIG. 1.

The interpolation filters in this embodiment are disclosed in detail with comparison to standardization to 1080i format.

Positions of the output 1440p-signal with respect to the input signals (format interpolation phase) are:

480p→{0, 1/3, 2/3}

720p→{0, 1/2}

1080p→{0, 3/4, 1/2, 1/4}

The scale-up/down processing section 2 is thus equipped with interpolation filters corresponding to the interpolation phases.

On the contrary, positions of the output 1080i-signal with respect to the input signals (format interpolation phase) in standardization to 1080i format are:

480p→{0, 4/9, 8/9, 3/9, 5/9, 2/9, 6/9, 1/9}

720p→{0, 2/3, 1/3}

This indicates that a lot of interpolation phases are generated in standardization to 1080i format compared to standardization to 1440p format.

Standardization to 1440p format in this embodiment requires only six interpolation filters in accordance with the generated interpolation phases for the scale-up/down processing section 2. Small-hardware and accurate interpolation filters can be constructed with adders, but no multiplies necessary.

Contrary to this, standardization to 1080p format requires ten interpolation filters with multipliers of high computation accuracy and high filter coefficient flexibility, thus resulting in large hardware. Moreover, most denominators of the interpolation phases in standardization to 1080p format is nine which causes low interpolation accuracy.

Figures 3A, 3B:
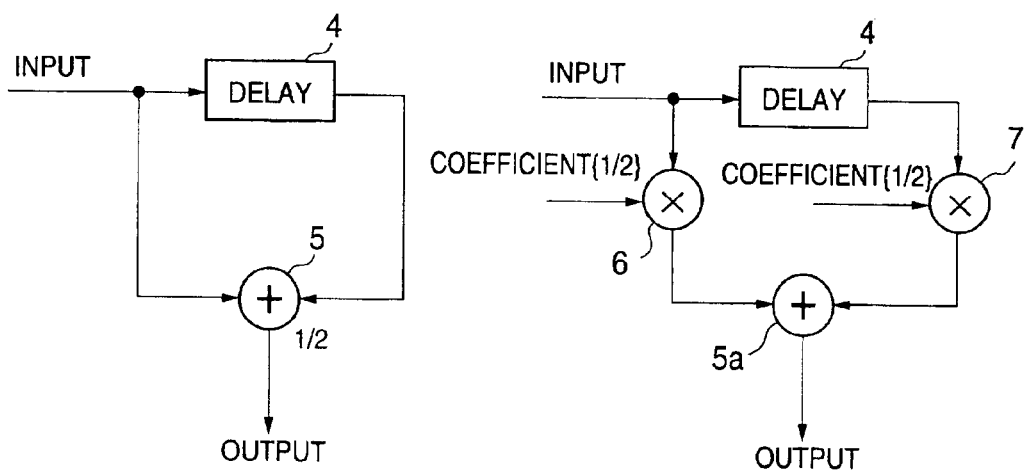
FIG. 3A shows a block diagram of an interpolation filter.
FIG. 3B shows another block diagram of an interpolation filter.

Disclosed next with reference to FIGS. 3A and 3B is how the present invention achieves small hardware.

FIGS. 3A and 3B show interpolation filters of coefficients {1/2, 1/2}, with the same reference numbers for the same elements. The interpolation filter in FIG. 3A has a delay unit 4 and a 1/2 adder 5. The interpolation filter in FIG. 3B equivalent to that of FIG. 3A has a delay unit 4, an adder 5a and multipliers 6 and 7 for multiplying an input signal by ½.

The interpolation filter in FIG. 3B, with the same computation accuracy as that for the counterpart in FIG. 3A, requires hardware about 33 times the latter. This is because, for example, for an 8-bit input signal, the multiplier for multiplying the 8-bit input signal by 8-bit coefficient requires 16 adders.

The interpolation filter in FIG. 3A has a low coefficient flexibility entirely but a high coefficient flexibility for fixed coefficients within bit accuracy.

The present invention with standardization of video formats into 1440p requires only a delay unit and an adder for an interpolation filter, thus achieving small hardware, which is smaller than in standardization of video formats into 1080p even if an interpolation filter for the latter is constituted by a delay unit and an adder like the former.

The present invention with standardization of video formats into 1440p basically achieves smaller hardware than standardization of video formats into 1080p, and achieves further small hardware with an interpolation filter constituted only by a delay unit and an adder.

Moreover, the present invention offers accurate interpolation with less picture degradation.

In contrast, interpolation filters for standardization of video formats into 1080p have to cover a lot of interpolation phases which cause difference in picture quality, thus resulting in picture degradation. This is because signal components closest to an original video signal exist at interpolation phases close to 0 or 1 whereas high frequency components are lost at the highest degree at interpolation phases close to 1/2 at which surrounding signal components are mixed with the original video signal. A lot of interpolation phases existing in one picture will generate an interpolation streak depending on whether or not there are high frequency components.

Therefore, compared to conversion into 1080p (and also 1080i) that requires a lot of interpolation phases, conversion into 1440p (and also 1440i) that requires less interpolation phases according to the present invention provides less picture degradation, thus achieving high picture quality.

Discussed with reference to FIG. 2 are interpolation phases for scanning line conversion from 480p, 720p and 1080p to 1440p format. Original pixels are output as they are at phase 0. Thus, the output original pixels will have high frequency components compared to other interpolated pixels.

Figure 4:
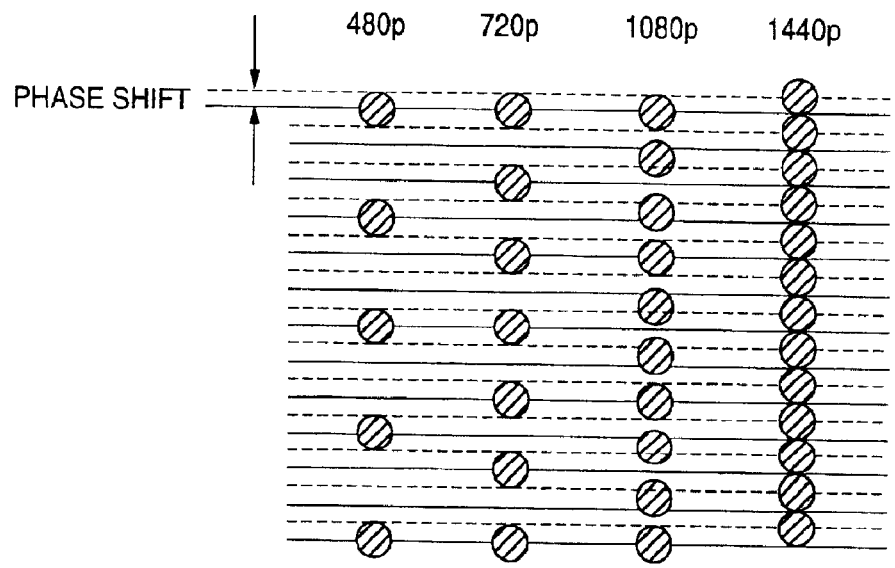
FIG. 4 illustrates phase-shifting in conversion of 480p, 720p and 1080p formats into 1440p format.

In order avoid such a problem, the scale-up/down processing section 2 shifts interpolation phases in scanning line conversion processing for all of 480p, 720p and 1080p formats as illustrated in FIG. 4. Interpolation phase-shifting eliminate picture degradation such as line flickers. Appropriate coefficient-settings for interpolation filters achieves interpolation phase-shifting such as shown in FIG. 4.

Interpolation phase-offsetting shown in FIG. 4 could loose picture sharpness a little bit. Such picture deterioration can, however, be eliminated by controlling picture quality with high frequency component-compensation after conversion into 1440p or 1440i by an enhancer etc.

A 1440p-video signal output from the scale-up/down processing section 2 in FIG. 1 is supplied to a progressive-to-interlace (P-I) conversion section 3. The P-I conversion section 3 is not required for a video signal processing apparatus according to the present invention when the apparatus outputs a 1440p-video signal. It is also not required for a video displaying apparatus according to the present invention when the apparatus displays a 1440p-video signal. This embodiment, however, requires the P-I conversion section 3 for outputting a 1440i-video signal. The P-I conversion section 3 converts the input 1440p-video signal by interlace conversion into a 1440i-video signal.

Figure 5:
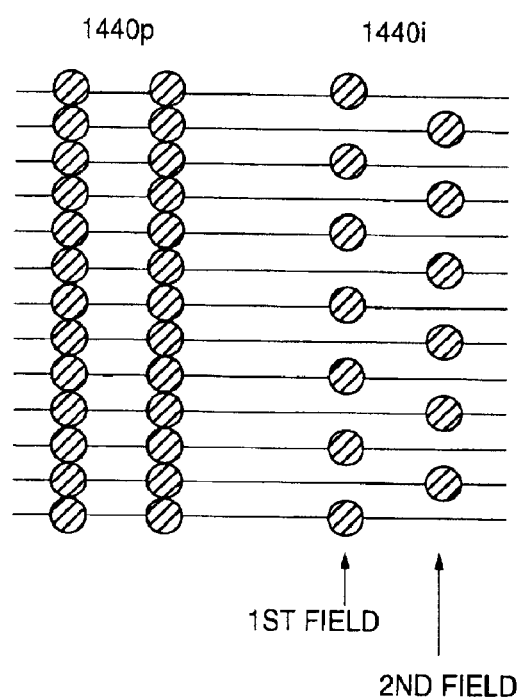
FIG. 5 illustrates progressive-to-interlace conversion.

In detail, as illustrated in FIG. 5, a scanning line of the 1440p-video signal is decimated for every second line and then the decimating phase is shifted for one scanning line per field. The input 1440p-progressive video signal is thus converted into a 1440i-interlaced video signal of a horizontal frequency of 45 KHz, which is interlaced at a first filed and a second field.

The 1440i-video signal may be output from the video signal processing apparatus. It may also be displayed on a displaying section such as a CTR on a video displaying apparatus in a way that the output of the P-I converter 3 (FIG. 1) is supplied to a driver for driving the displaying section to display pictures.

A CRT-video displaying apparatus may have an deflecting circuit capable of displaying 720p-video signals with shifting vertical deflecting phases in accordance with output phases of signal processing for displaying 1440i-video signals.

A video displaying apparatus according to the present invention can thus be provided with a little improvement of known driver such as deflecting circuitry. Interlace-compatible dot-matrix displaying apparatus can also be used for displaying 1440i-video signals with signals supplied in accordance with output fields of signal processing. A video displaying apparatus according to the present invention can thus be provided with no drastic cost-up.

The I-P conversion section 1 in FIG. 1 is advantageous as discussed below when it generates a signal equivalent to a progressive signal instead of actually doubling scanning line density of the input 480i or 1080i-video signal. In such processing, the scale-up/down processing section 2, the P-I conversion section 3 and also any circuitry connected thereto will operate at a 74.25 MHz-clock rate the same as for 720p format. A clock rate for 1080i format is also 74.25 MHz the same as for 720p format. Therefore, the 720p-, 1080i- and 1440i-video signals can be processed at the same clock frequency.

A horizontal cyclic period or the number of horizontal effective pixels for the 1080i- and 1440i-video signals is 1280 equivalent to that for the 720p-video signal at the same clock frequency. The number of horizontal effective pixels for the 1080i-video signal is decreased to 1280 from 1920 (the original number of pixels) when processed at 74.25 MHz. The number of horizontal effective pixels 1280 is, however, sufficient for household TV sets and dot-matrix displaying apparatus. A clock rate for the output of the P-I conversion section 3 may of course be made higher so that the number of horizontal effective pixels becomes 1920 after conversion into 1440i format.

As disclosed above, the video format is standardized into 1440i (or 1440p) in the video signal processing apparatus and the video displaying apparatus according to the present invention. Conversion into a single video-signal format is thus achieved with small-hardware interpolation filters. In addition to this advantage, this invention is advantageous for displaying extremely high-quality pictures on multi-screen as disclosed later.

Figure 6:
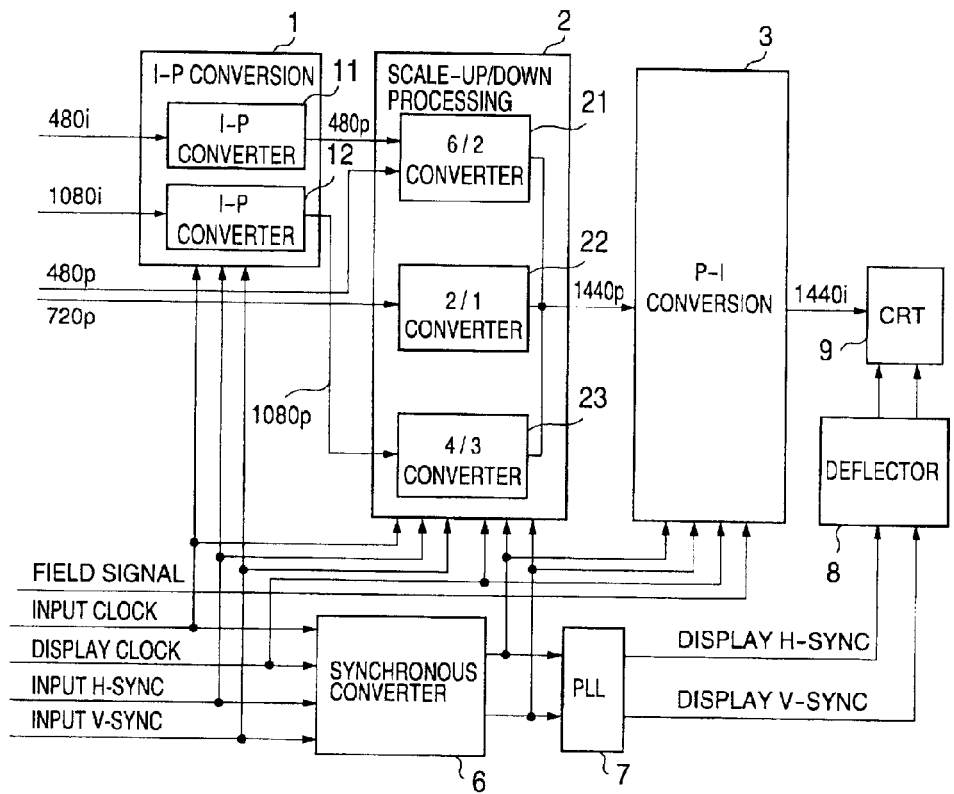
FIG. 6 shows a block diagram of a second embodiment according to the present invention.

Disclosed next with reference to FIG. 6 is a video displaying apparatus having a CRT as a displaying section according to the present invention.

Elements shown in FIG. 6 that are the same as or analogous to elements shown in FIG. 1 are referenced by the same reference numbers and will not be explained in detail. The video signal source VD is not shown here for simplicity.

Several advantages are discussed above for signal processing at the same number of effective scanning lines for different input video formats. In contrast, signal processing at the same horizontal frequency is important for a video displaying apparatus having a CRT for different input formats.

The output 1440i-video signal of the P-I conversion section 3 shown in FIG. 6 is supplied to a CTR 9 through several signal processing (not shown and disclosed).

Supplied to a synchronous converter 6 are a horizontal synchronization signal (input horizontal synchronization signal, INPUT H-SYNC), a vertical synchronization signal (input vertical synchronization signal, INPUT V-SYNC) and a sampling clock signal (input clock signal) for input video signals, and also a display clock signal for displaying the 1440i-video signal on the CRT 9.

For an input 480i-video signal, a frequency of the input clock signal is 13.5 MHz and that of the input vertical synchronization signal is 60 Hz or 59.94 Hz. A frequency of the display clock signal is 74.25 MHz when that of the input vertical synchronization signal is 60 Hz. It is, however, 74.176 MHz when that of the input vertical synchronization signal is 59.94 Hz.

The input clock signal and the input vertical and horizontal synchronization signals are also supplied to the I-P conversion section 1, the scale-up/down processing section 2 and the P-I conversion section 3.

Although not shown in FIG. 1, such an input clock signal and input vertical and horizontal synchronization signals are also supplied to the I-P conversion section 1, the scale-up/down processing section 2 and the P-I conversion section 3.

The synchronous converter 6 in FIG. 6 converts the input horizontal synchronization signal into a horizontal synchronization signal at around 45 KHz by synchronous conversion based on the input clock signal and the display clock signal. Synchronous conversion may include adjustments to width or phase of synchronization signals. In this embodiment, the synchronous converter 6 adjusts a width or a phase of the input vertical synchronization signal and outputs the adjusted signal with no frequency conversion.

The horizontal synchronization signal at around 45 KHz and the vertical synchronization signal at 60 Hz or 59.94 Hz are supplied to a PLL circuit 7. These horizontal and vertical synchronization signals are also supplied to the scale-up/down processing section 2 and the P-I conversion section 3.

The PLL circuit 7 outputs a display horizontal synchronization signal (DISPLAY H-SYNC) stable at 45 KHz required for displaying the 1440i-video signal on the CRT 9 based on the input horizontal synchronization signal. The vertical synchronization signal, however, passes through the PLL circuit 7 with no processing and output as a display vertical synchronization signal (DISPLAY V-SYNC). The PLL circuit 7 also operates as an automatic frequency controller (AFC).

The display horizontal and vertical synchronization signals output from the PLL circuit 7 are supplied to a deflector 8. The deflector 8 includes a deflecting yoke (not shown) attached to the CRT 9, for deflecting CRT-electron beams into horizontal and vertical directions so that the 1440i-video signal from the P-I conversion section 3 is displayed on the CRT 9 at a horizontal scanning frequency of 45 KHz.

The PLL circuit 7 supplies only the display horizontal synchronization signal at the frequency of 45 KHz to the deflecting circuit 8 because the 1440i-video signal at the horizontal frequency of 45 KHz is supplied to the CRT 9 in this embodiment. However, it is not always necessary to have the same frequency for the horizontal frequency of the video signal to be supplied to the CRT 9 and the frequency (horizontal scanning frequency) of the display horizontal synchronization signal to be supplied to the deflector 8.

Figure 7:
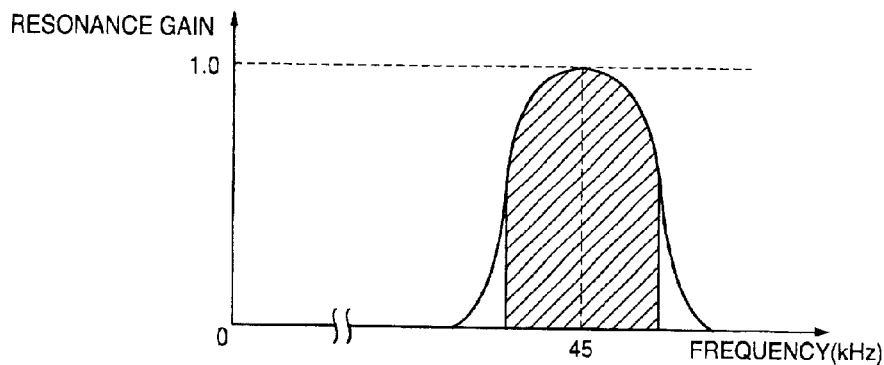
FIG. 7 is a graph for explaining the second embodiment shown in FIG. 6.

Illustrated in FIG. 7 is a locking rage (pull-in frequency range) for the PLL circuit 7. The PLL circuit 7 can pull in frequency within a range of about ±5% with a center frequency at a resonance gain of 1.0 for stably driving the CRT 9. It is thus sufficient for the PLL circuit 7 that it has the center frequency of 45 KHz that is included in the locking rage as shown in FIG. 7 for supplying a display horizontal synchronization signal at a frequency within the locking range to the deflector 8.

It is very effective to set all input video signals at the horizontal frequency of 45 KHz for displaying pictures of several formats according to the present invention. For example, the horizontal frequency for the XGA format (vertical frequency of 60 Hz) under the VESA standards is 48.4 KHz. The PLL circuit 7 can include this horizontal frequency of 48.4 KHz in the locking range. The video displaying apparatus according to the present invention is thus capable of displaying pictures of XGA-format video signals with no adjustments to horizontal scanning frequency.

Disclosed next are a video signal processing apparatus and a video displaying apparatus having a displaying section with an aspect ratio of 4:3.

Figure 10:
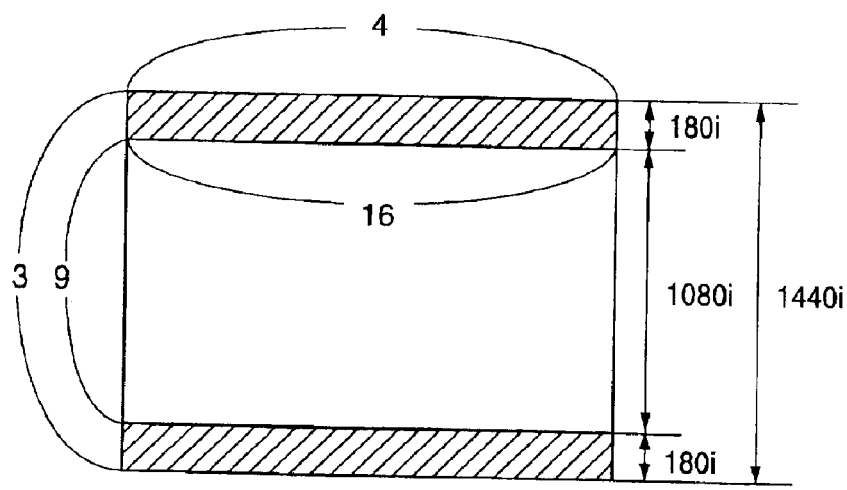
FIG. 10 is an illustration of display on screen in the third and the fourth embodiment.

For displaying pictures at an aspect ratio of 16:9 (so called wide-screen pictures) on a displaying section with an aspect ratio of 4:3, it is preferable, as illustrated in FIG. 10, to provide a wide-screen picture almost on the middle section in the vertical direction with black or gray non-video signal components over and beneath the wide-screen picture.

The video displaying apparatus according to the present invention is capable of displaying pictures of a 1440i-video signal, and hence capable of displaying a wide-screen picture at a aspect ratio of 16:9 as it is if it is carried by a 1080i-video signal. When a picture of a 1080i-video signal is provided almost the middle section in the vertical direction, 180i-non-video signal components may be provided on non-picture zones over and beneath the wide-screen picture.

Figure 8:
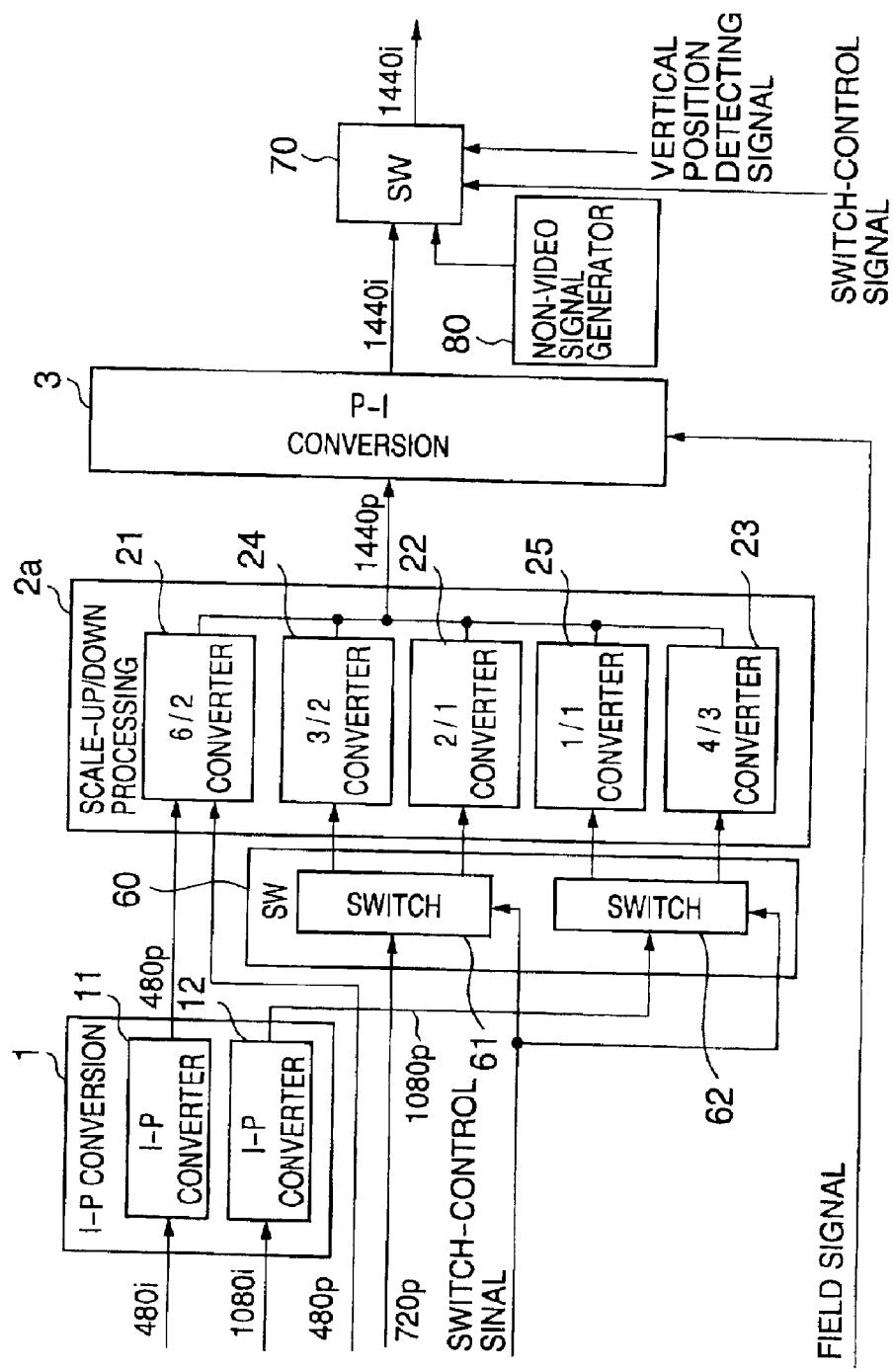
FIG. 8 shows a block diagram of a third embodiment according to the present invention.

FIG. 8 shows an embodiment for achieving video displaying illustrated in FIG. 10. Elements shown in FIG. 8 that are the same as or analogous to elements shown in FIG. 1 are referenced by the same reference numbers and will not be explained in detail. The video signal source VD is not shown here for simplicity. This embodiment can select video displaying such as illustrated in FIG. 10 for 1080i- and 720p-input video signals.

A 1080p-video signal output from the I-P converter 12 is supplied to a switch 62 of a switching section (SW) 60. A 720p-video signal is supplied to a switch 61 of the switching section 60. The switch 61 is to switch the input 720p-video signal so that it is supplied to a 2/1 converter 22 or a 3/2 converter 24 of a scale-up/down processing section 2a. The switch 62 is to switch the input 1080p-video signal so that it is supplied to a 4/3 converter 23 or a 1/1 converter 25 of the scale-up/down processing section 2a.

A switch-control signal is supplied to the switches 61 and 62 by a user for connecting the video signal processing apparatus shown in FIG. 8 to a displaying section having the aspect ratio of 16:9 or another displaying section having the aspect ratio of 4:3.

The following disclosure is made for wide-screen pictures if input signals are 1080i- and 720p-video signals.

The switching section 60 is provided so that the video signal processing apparatus in FIG. 8 can be compatible with both the aspect ratios of 4:3 and 16:9 on the displaying section. However, the switching section 60 and the 2/1 converter 22 and the 4/3 converter 23 of the scale-up/down processing section 2a can be eliminated, for example, for an all-in-one video displaying apparatus equipped with a video signal processing apparatus and a displaying section having a single aspect ratio of 4:3 for displaying only wide-screen pictures of 1080i- and 720p-video signals.

For digital broadcasting, aspect-ratio data, that is included in additional information added to a TV-program signal carrying video and audio signals, can be used as the switch-control signal. In other words, the aspect-ratio data can be used as the switch-control signal for an all-in-one video displaying apparatus equipped with the video signal processing apparatus shown in FIG. 8 and a displaying section having the aspect ratio of 4:3 according to the present invention.

In FIG. 8, the 3/2 converter 24 of the scale-up/down processing section 2a multiplies the number of scanning lines of the input 720p-video signal by 3/2 to generate a signal of 1080 scanning lines. The generated signal is once stored in a memory (not shown) and retrieved with a clock signal at a frequency of 1440p signal. The retrieval timing is shifted by the 3/2 converter 24 in accordance with the number of scanning lines that is not 1440 but 1080. The number of scanning lines of the output signal of the 3/2 converter 24 is 1080, however, the output signal has been converted into 1440p format with retrieval-rate adjustments.

The 1/1 converter 25 of the scale-up/down processing section 2a multiplies the number of scanning lines of the input 1080p-video signal by 1/1, thus generating a signal with no conversion of the number of scanning lines. The generated signal is once stored in a memory (not shown) and retrieved with a clock signal at a frequency of 1440p signal. The retrieval timing is shifted by the 1/1 converter 25 in accordance with the number of scanning lines that is not 1440 but 1080. The number of scanning lines of the output signal of the 1/1 converter 25 is 1080, however, the output signal has been converted into 1440p format with retrieval-rate adjustments.

Accordingly, the output of the P-I conversion section 3 is a1440i-format signal with 1440 scanning lines or a 1440i-format signal with 1080 scanning lines.

The 1440i-format signal of the P-I conversion section 3 is supplied to a switching section (SW) 70. A non-video signal is also supplied to the switching section 70 from a non-video signal generator 80. Supplied further to the switching section 70 are a control signal for controlling as to whether to switch the output of the P-I conversion section 3 and the non-video signal from the non-video signal generator 80 and also a vertical position detecting signal. The vertical position detecting signal is generated from horizontal and vertical synchronizing signals and used for detecting locations of video signals on the displaying section in the vertical direction.

The switching section 70 always selects the output of the P-I converter 3 when an aspect ratio for input video signals is 4:3, or input video signals are 480i and480p signals. On other hand, the switching section 70 selects the non-video signal from the non-video signal generator 80 on the upper and lower zones of a displaying section and also selects the output of the P-I converter 3 when an aspect ratio for input video signals is 16:9, or input video signals are 1080i and 720p signals.

Accordingly, a 1440i-format video signal having 1080 scanning lines is added a non-video signal by the switching processing to become a 1440i-format video signal having 1440 scanning lines, thus pictures being displayed as illustrated in FIG. 10.

Figure 9:
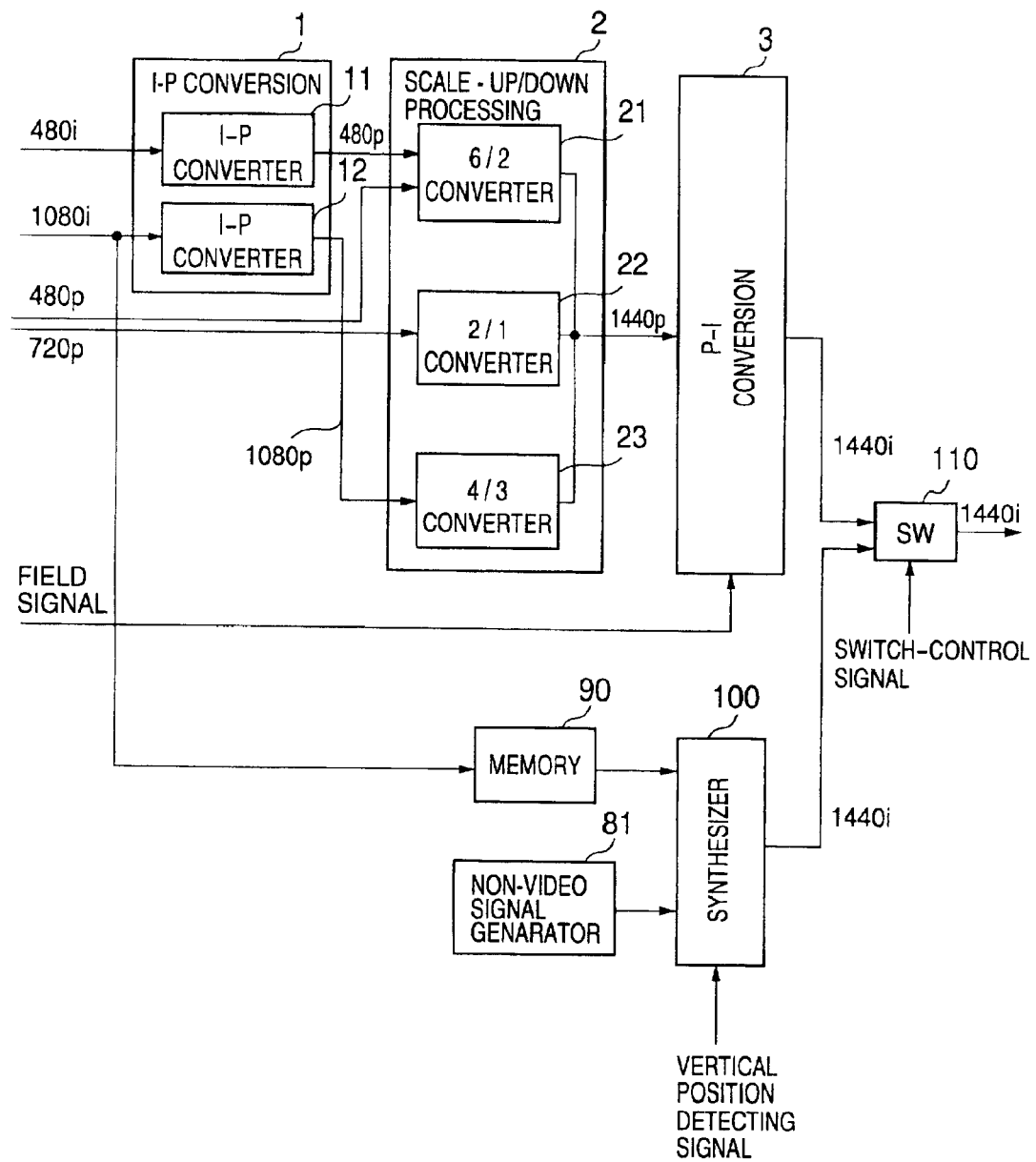
FIG. 9 shows a block diagram of a fourth embodiment according to the present invention.

FIG. 9 shows another embodiment for achieving video displaying illustrated in FIG. 10. Elements shown in FIG. 9 that are the same as or analogous to elements shown in FIG. 1 are referenced by the same reference numbers and will not be explained in detail. The video signal source VD is not shown here for simplicity.

The embodiment shown in FIG. 9 is structured for achieving video displaying illustrated in FIG. 10 when an input video signal is 1080i format for hardware simplification. Although not explained, video displaying shown in FIG. 10 is also achieved with the same structure as shown in FIG. 9 when an input video signal is 720p format.

In FIG. 9, the 1080i-input video signal is once stored in a memory 90 and retrieved with a clock signal at a frequency of 1440i signal. The signal retrieved from the memory 90 has 1080 scanning lines but has been converted into 1440p format with retrieval-rate adjustments. A non-video signal generator 81 functions like the counterpart 80 shown in FIG. 8.

A synthesizer 100 synthesizes the output signal of the memory 90 and a non-video signal from the non-video signal generator 81 so that non-video signal components are added over and beneath the output signal. The output of the synthesizer 100 thus becomes a 1440i-format signal having 1440 scanning lines such as shown in FIG. 10.

A switch-control signal such as shown in FIG. 8 is supplied to a switching section (SW) 110. In response to the switch-control signal, the switching section 110 selects either the output of the P-I conversion section 3 or the synthesizer 100 for achieving video displaying shown in FIG. 10.

Disclosed next with reference to FIGS. 11A to 11C, 12 and 13 is displaying multi-screen pictures.

Figure 11A:
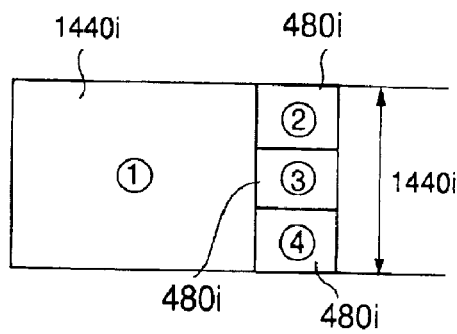
FIG. 11A is an illustration of display on multi-screen.

FIG. 11A illustrates a 1440i-format picture ① displayed at an aspect ratio of 4:3 on the left zone of a screen with an aspect ratio of 16:9, with 480i-format pictures ②, ③ and ④ displayed at the aspect ratio of 4:3 on the remaining zones.

The 480i-format pictures can be displayed as aligned in the vertical direction on the multi-screen because 1440i format corresponds to 480i×3. The 480i-format pictures ②, ③ and ④ have been scaled down to ¼ in the horizontal direction due to cyclic decimation of pixels in the horizontal direction but no decimation in the vertical direction. Increase in scanning lines is of course not required. Therefore, picture quality in the vertical direction is the same as for original pictures, and hence no picture deterioration occurs. The locations of the picture ① and the pictures ②, ③ and ④ may be reversed.

Moreover, 480p-format pictures can be displayed as the pictures ②, ③ and ④ at the aspect ratio of 4:3 with conversion of 480p-progressive signals into interlaced signals, with extremely less picture deterioration.

As disclosed, the 1440i-format picture ① shown in FIG. 11A has been converted from any one of the 480i-, 1080i-, 480p- and 720p-video signals. The 1080i- and 720p-pictures are usually multi-screen pictures at the aspect ratio of 16:9 and which can be displayed as shown in FIG. 11A as described below.

For 1080i pictures, a 1080i-video signal is converted into 1440i format with no scanning line conversion and 180i-black or -gray non-video signal components are added over and beneath the 1440i-format signal so that the 1080i signal is converted into a 1440i-video signal having 1440 scanning lines.

For 720p pictures, a 720p-video signal is converted into 1080i format and further to 1440i format with no scanning line conversion and 180i-black or -gray non-video signal components are added over and beneath the 1440i-format signal so that the 720p signal is converted into a 1440i-video signal having 1440 scanning lines.

Figure 11B:
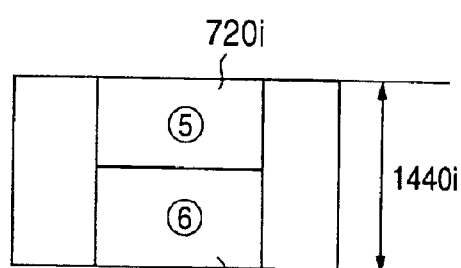
FIG. 11B is an other illustration of display on multi-screen.

FIG. 11B illustrates 720i-format pictures ⑤ and ⑥ displayed on the almost center zone as aligned in the vertical direction at an aspect ratio of 16:9, both being interlaced signals that have been converted from 720p-video signals. These pictures can also be obtained by progressive-to-interlace conversion, thus achieving extremely less picture deterioration.

Figure 11C:
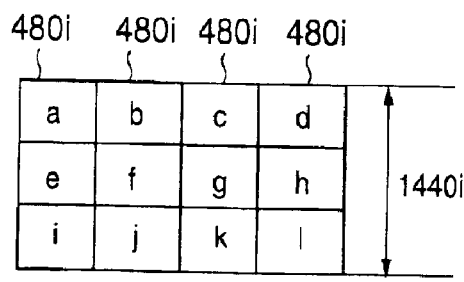
FIG. 11C is still another illustration of display on multi-screen.

FIG. 11C illustrates 480i-format pictures "a" to "l" displayed on 12 small screens divided from a screen having an aspect ratio of 16:9. These pictures "a" to "l" have been subjected to cyclic decimation of pixels in the horizontal direction due to scaling-down but no decimation in the vertical direction. Therefore, picture quality in the vertical direction is the same as for original pictures, and hence no picture deterioration occurs.

Figure 12:
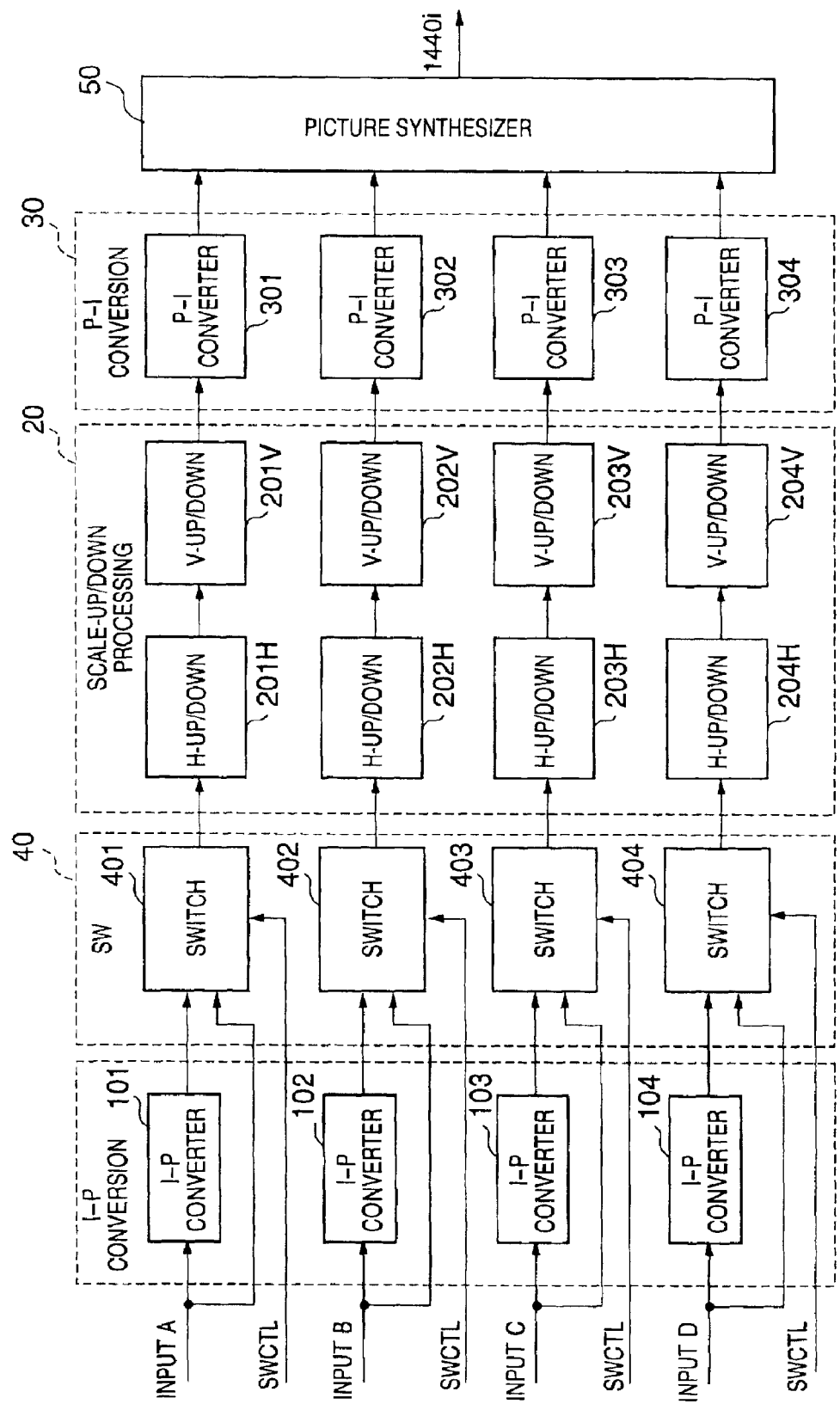
FIG. 12 shows a block diagram of a video signal processing apparatus for display on multi-screen such as shown in FIGS. 11A to 11C.

Disclosed next with reference to FIG. 12 is an embodiment of a video signal processing apparatus for displaying multi-screen pictures as described above. The video signal source VD is not shown here for simplicity. This embodiment particularly achieves simultaneous displaying of four multi-screen moving pictures at the maximum.

In FIG. 12, each of inputs "A" to "D" is any one of 480i-, 1080i-, 480i- and 720p-video signals.

The inputs "A" to "D" are supplied to I-P converters 101 to 104, respectively, of an I-P conversion section 10. The inputs "A" to "D" are further supplied to switches 401 to 404, respectively, of a switching section (SW) 40. The switch 401 selects either the output of the I-P converter 101 or the input "A" in response to a switch-control signal SWCTL. The switches 402 to 404 perform the same switching operation.

The 480i (and 1080i)-interlaced video signal as any one of the inputs "A" to "D" requires interlace-to-progressive conversion to become a progressive signal by the corresponding I-P converter 101, 102, 103 or 104, before being supplied to a scale-up/down processing section 20.

On the contrary, the 480p (and 720p)-progressive video signal as anyone of the inputs "A" to "D" is supplied to the scale-up/down processing section 20 with no interlace-to-progressive conversion.

The switches 401 to 404 select the inputs "A" to "D", respectively, or the outputs of the I-P converters 101 to 104, respectively, in accordance with the corresponding input formats. The switch-control signal SWCTL can be generated by detecting the interlace or the progressive format over the inputs "A" to "D".

The output signals of the switching section 40 are supplied to the scale-up/down processing section 20 having horizontal scale-up/down units (H-UP/DOWN) 201H to 204H and vertical scale-up/down units (V-UP/DOWN) 201V to 204V. Each of the vertical scale-up/down units 201V to 204V has the 6/2 converter 21, the 2/1 converter 22 and the 4/3 converter 23 the same as the scale-up/down processing section 2 shown in FIG. 1. The vertical scale-up/down units 201V to 204V may output input signals with no conversion into 1440p format, which depends on multi-screen specifications. The horizontal scale-up/down units 201H to 204H scale up or down the input videos in the horizontal direction in accordance with the corresponding multi-screens.

When the inputs "A" to "D" (FIG. 12) correspond to the pictures ①, ②, ③ and ④, respectively, in FIG. 11A, the vertical scale-up/down unit 201V converts the input "A" into 1440p format whereas the vertical scale-up/down units 202V to 204V do not convert the inputs "B" to "D", respectively, into 1440p and output 480p as they are.

When the inputs "A" and "B" (FIG. 12) correspond to the pictures ⑤ and ⑥, respectively, in FIG. 11B, the vertical scale-up/down unit 201V does not convert the inputs "A" and "B" into 1440p but outputs 720p as they are.

The horizontal scale-up/down units 201H to 204H scale down the pictures in the horizontal direction in accordance with the size of the corresponding multi-screens.

Displaying multi-screen pictures such as illustrated in FIG. 11C by the video signal processing apparatus in FIG. 12 will be disclosed later.

The 1440p (480p or 720p) -video signals from the scale-up/down processing section 20 are supplied to the corresponding P-I converter 301, 302, 303 and 304 of the P-I conversion section 30 for progressive-to-interlace conversion to generate interlaced video signals. The P-I conversion is performed based on a field signal (not shown) that is supplied to each of the P-I converters 301, 302, 303 and 304.

The outputs of the P-I converters 301, 302, 303 and 304 are supplied to a picture synthesizer 50 for synthesizing the outputs to generate a 1440i-video signal of multi-screen pictures.

Figure 13:
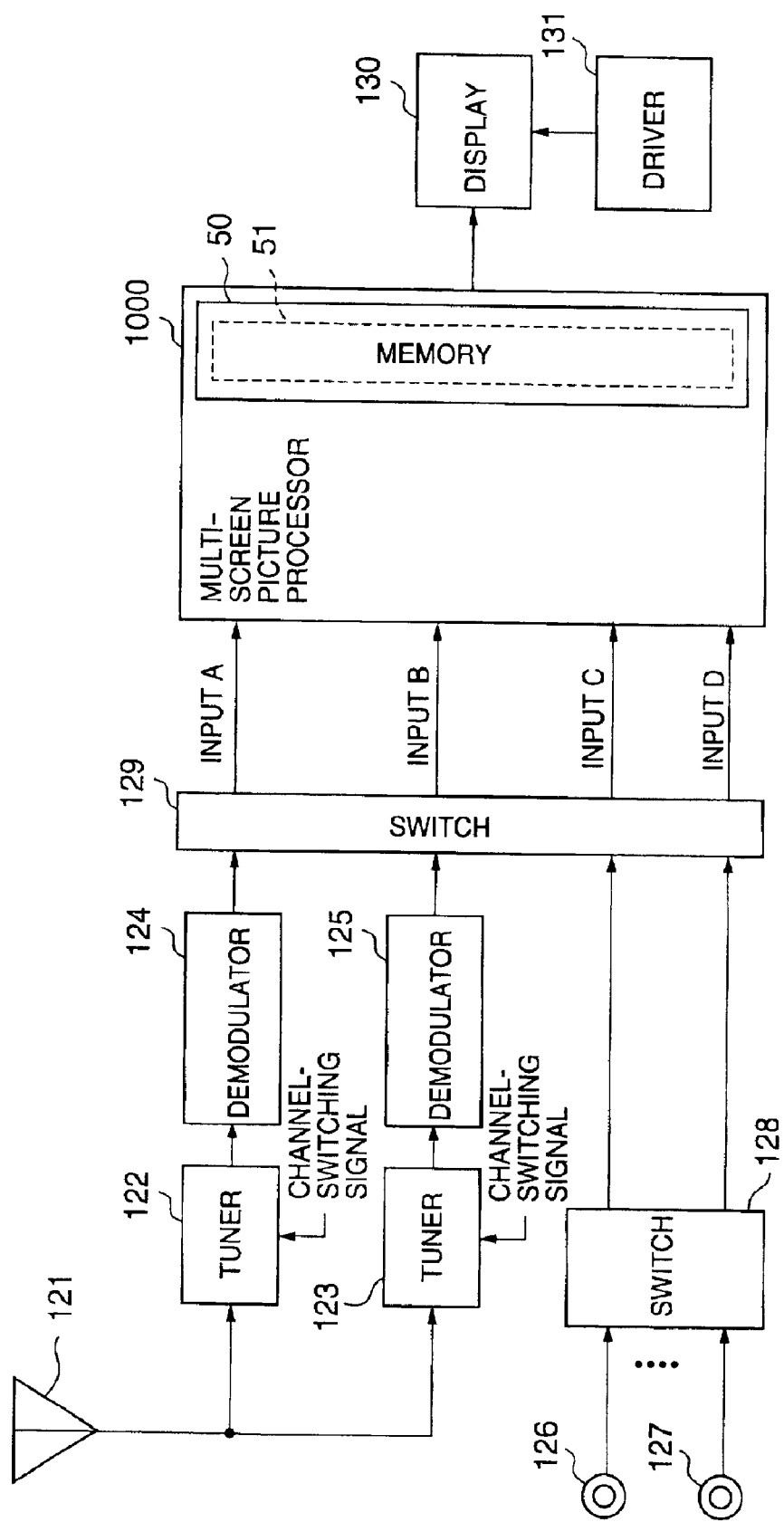
FIG. 13 shows a block diagram of a fifth embodiment according to the present invention.

Disclosed next with reference to FIG. 13 is a further embodiment of a video displaying apparatus according to the resent invention.

In FIG. 13, a TV broadcast signal (IF signal) received at an antenna 121 is supplied to tuners 122 and 123. In response to channel-switching signal from a controller (not shown), the tuners 122 and 123 are tuned to desired channels and output tuned signals. The tuned signals are supplied to demodulators 124 and 125 for demodulation to generate video signals.

Supplied via external input terminals 126 and 127 are video signals, for example, from a video tape recorder or a vide disc player (not shown). The external input terminals may be three or more. The tuners 122 and 123, the external input terminals 126 and 127 and other devices such as a video tape recorder and a vide disc player all correspond to the video signal source VD shown in FIG. 1. In other words,the video displaying apparatus shown in FIG. 13 receives video signals from several video signal sources.

The video signals supplied via the external input terminals 126 and 127 are fed to a switch 129 via a switch 128. The switch 128 may be eliminated in this embodiment because it will be provided for selecting two signals from among three or more signals input via three or more external input terminals.

The switch 129 supplies the four signals from the demodulators 124 and 125 and the switch 128 to a multi-screen picture processor 1000.

The multi-screen picture processor 1000 has the structure shown in FIG. 12. The four outputs of the switch 129 correspond to the inputs "A" to "D" shown in FIG. 12. The switch 129 switches the inputs "A" to "D" in accordance with how to arrange pictures of these inputs on a multi-screen.

The output of the multi-screen picture processor 1000 is supplied to a displaying section 130 having an aspect ratio of 16:9, which is driven by a driver 131 having a deflector and a deflecting yoke attached to the displaying section 130.

The tuners 122 and 123 and the external input terminals 126 and 127 in FIG. 13 are video signal sources. Moving pictures can be displayed on the entire multi-screen shown in FIGS. 11A and 11B by supplying video signals from these four video signal sources to the multi-screen picture processor 1000. As understood from the disclosure which will made later, the picture synthesizer 50 of the multi-screen picture processor 1000 also operates as a video signal source for supplying video signals of still pictures based on video signals from the four video signal sources.

The disclosure made above is to display moving pictures on a multi-screen. However, not only that, still pictures can be displayed on the entire or a portion of the multi-screen.

Disclosed below is displaying multi-screen pictures such as illustrated in FIG. 11A only from the output video signals of the tuners 122 and 123 shown in FIG. 13.

In FIG. 13, the output video signal of the tuner 122 is converted by the multi-screen processor 1000 into 1440i format as the pictures ① in FIG. 11A.

The tuner 123 cyclically switches the received channels per predetermined period in response to the channel-switching signal so that the output video signals of the tuner 123 are switched per predetermined period.

The picture synthesizer 50 of the multi-screen picture processor 1000 has a memory 51 (FIG. 13) for storing video signals of still pictures for at least past two channels before channel switching. Moving pictures of the presently received channel are displayed as any one of the pictures ②, ③ and ④, and the still pictures stored in the memory 51 are displayed as the remaining two pictures in FIG. 11A.

The video displaying apparatus shown in FIG. 13 is also capable of displaying multi-screen pictures such as illustrated in FIG. 11C with almost the same processing.

One of the tuners (for example, the tuner 122) only is used to cyclically switch the received channels per predetermined period in response to the channel-switch signal.

The memory 51 stores video signals of still pictures for at least past 11 channels before channel switching. Moving pictures of the presently received channel are displayed as any one of the pictures "a" to "l" which are allocated for instance to channels 1 to 12, and the still pictures stored in the memory 51 are displayed as the remaining pictures in FIG. 11C.

In FIGS. 11A to 11C, the pictures on the multi-screens are denoted as 1440i, 480i and 720i, which, however, does not mean that all effective scanning lines are displayed as each picture. In detail, as well known, no pictures are visually displayed on the upper and lower zones of a screen of displaying sections having a CRT due to over scanning. This is also true for other types of displaying sections, that is, some scanning lines are visually masked. Moreover, some pictures (pixels or scanning liens) may be deleted at edges of a multi-screen in the horizontal and vertical directions when pictures are arranged on the multi-screen in the horizontal and vertical directions. This picture deletion is performed for picture positioning on a multi-screen, which is different from picture scaling-down due to cyclic decimation.

One of the features of the present invention in FIG. 13 is that the multi-screen picture processor 1000 allocates substantially all of the scanning lines of a 480i-video signal to a portion (such as the picture ② shown in FIG. 11A) of a 1440i-video signal with no cyclic decimation of the scanning lines of the 480i-video signal and also no increase in the scanning lines, and the driver 131 drives the display section 130 to display pictures of the 1440i-video signal and the scanning line-allocated 480i-video signal.

Another feature of the present invention in FIG. 13 is that the multi-screen picture processor 1000 allocates substantially all of the scanning lines of three 480i-video signals for moving pictures or still pictures to a 1440i-video signal such that they are aligned in the vertical direction (such as the pictures ②, ③ and ④ shown in FIG. 11A) with no cyclic decimation of the scanning lines of the three 480i-video signals and also no increase in the scanning lines, and the driver 131 drives the display section 130 to display pictures of the 1440i-video signal and the scanning line-allocated three 480i-video signals.

As understood from the foregoing disclosure, 1440i and 1440p are extremely excellent formats in displaying the presently existing 480i-, 1080i-, 480p- and 720p-video signals at high picture quality with extremely less increase in hardware. These are also extremely excellent formats for displaying pictures on a multi-screen.

As disclosed above, the video signal processing apparatus and the video displaying apparatus according to the present invention are capable of conversion of several format-types of video signals into a single format with small-hardware interpolation filters.

Video signals of 480i, 480p and 720p formats will have scanning lines the number of which are double or more of the original scanning lines when converted into a single format, thus extremely high quality pictures being displayed according to the present invention.

The present invention also achieves extremely high quality pictures with almost no line flickers for 1440i-interlaced video signals.

Moreover, the present invention also achieves extremely less picture deterioration to multi-screen pictures.

Furthermore, the video signal processing apparatus and the video displaying apparatus according to the present invention are capable of displaying extremely high quality pictures with the least increase in hardware and complexity in signal processing.

The present invention also achieves extremely high picture quality on a screen having an aspect ratio of 4:3 for interlaced video signals having 1080 effective scanning lines at an aspect ratio of 4:3.

What is claimed is:

1. A video displaying apparatus including a first video signal source for outputting a first video signal that is either of an interlaced signal having 480 effective scanning lines, another interlaced signal having 1080 effective scanning lines, a progressive signal having 480 effective scanning lines and another progressive signal having 720 effective scanning lines, a second video signal source for outputting a second video signal that is an interlaced signal having 480 effective scanning lines at an aspect ratio of 4:3, and a displaying section having an aspect ratio of 16:9, the apparatus comprising:

a converter for converting the first video signal into a third video signal that is an interlaced signal having 1440 effective scanning lines;

a scale-down section for scaling down the second video signal in a horizontal direction of the displaying section by cyclically decimating pixels of the second video signal in the horizontal direction with no decimation of the scanning lines of the second video signal; and a synthesizer for synthesizing the third video signal and the scaled-down second video signal so that a picture of the third video signal is displayed on a zone in the horizontal direction of the displaying section and another picture of the scaled-down second video signal is displayed on a remaining zone of the displaying section;

wherein the second video signal source includes a tuner, the apparatus further comprising:

a channel switch for sequentially switching channels received by the tuner so that pictures of the second video signal are sequentially different from each other in accordance with the switched channels; and a memory for storing two still pictures of scaled-down signal components of the scaled-down second video signal, that correspond to two channels before switching, wherein the synthesizer synthesizes the third video signal and the scaled-down second video signal so that the picture of the third video signal is displayed on the zone in the horizontal direction of the displaying section, and the two sill pictures of the scaled-down signal components stored in the memory and another picture of a scaled-down signal component of the scaled-down second video signal, that corresponds to the present channel are displayed on the remaining zone as aligned in a vertical direction of the displaying section.

* * * * *